Dec. 18, 1951    M. O. DEAN    2,578,676
APPARATUS FOR HYDRAULIC MOTOR CONTROL
Filed April 9, 1947    2 SHEETS—SHEET 1
*Fig. 1.*
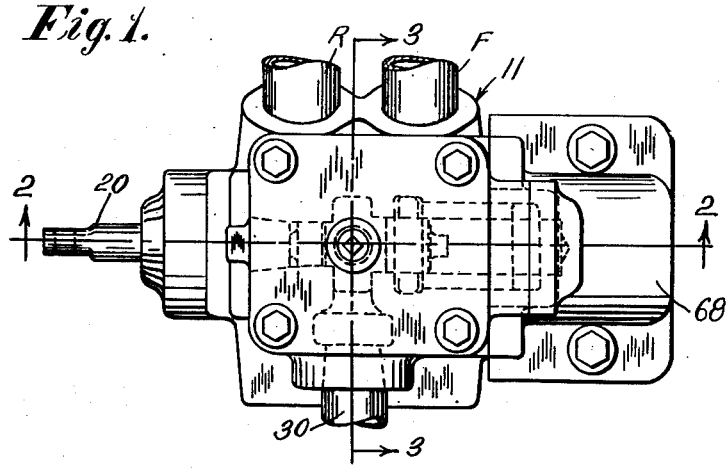
*Fig. 2.*
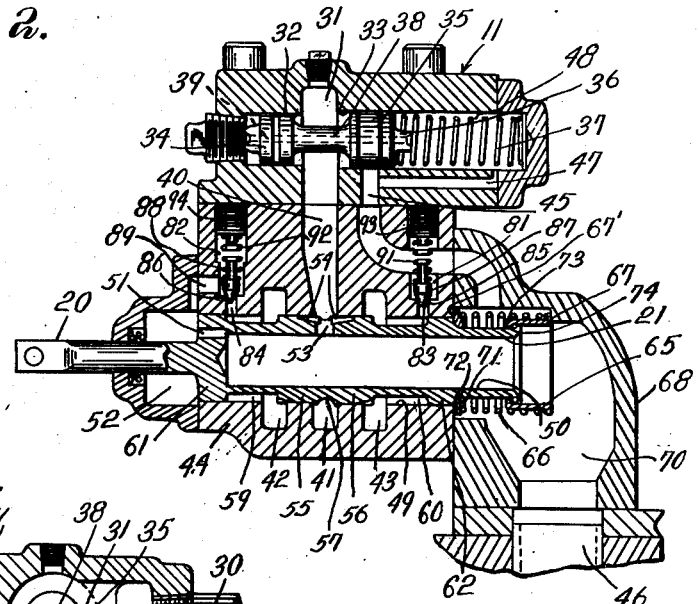
*Fig. 3.*
*Inventor:*
*Maxwell O. Dean.*
by
*Louis A. Maxson.*
*Attorney.*

Dec. 18, 1951   M. O. DEAN   2,578,676
APPARATUS FOR HYDRAULIC MOTOR CONTROL
Filed April 9, 1947   2 SHEETS—SHEET 2
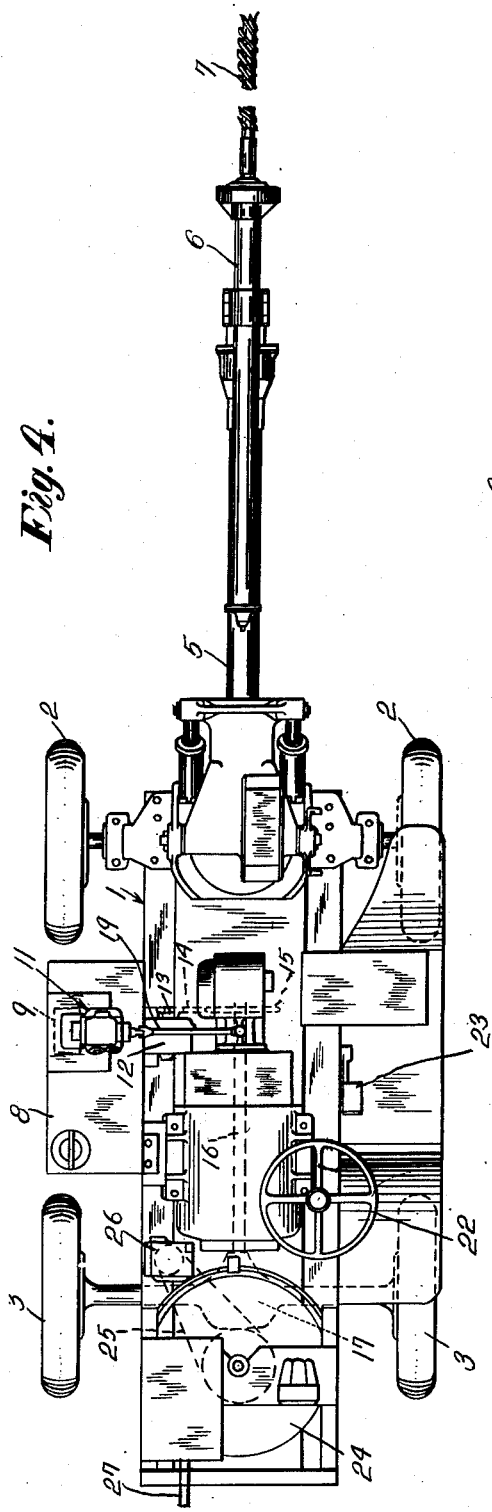
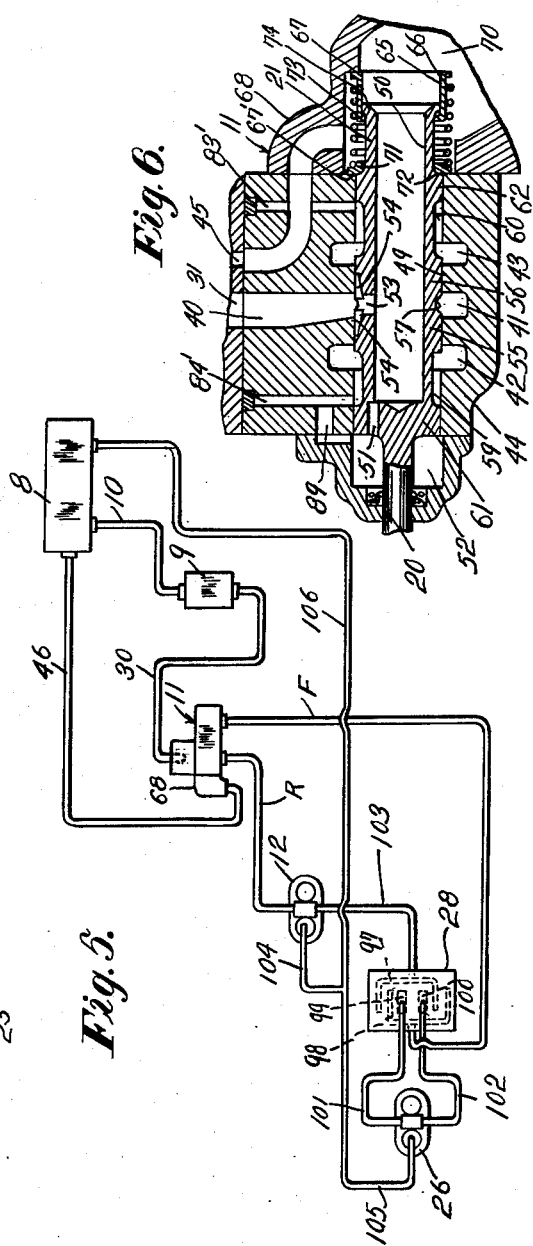
Inventor:
Maxwell O. Dean.
by
Louis A. Maxson.
Attorney.

UNITED STATES PATENT OFFICE 2,578,676

APPARATUS FOR HYDRAULIC MOTOR CONTROL

Maxwell O. Dean, Morgantown, W. Va., assignor to Joy Manufacturing Company, a corporation of Pennsylvania Application April 9, 1947, Serial No. 740,371

13 Claims. (Cl. 60—53)

My invention relates to propulsion systems for vehicles, and more particularly to hydraulic propulsion systems having means for reducing the shocks which are ordinarily produced when the hydraulic fluid is shut off from the propulsion motor or motors while the vehicle is in motion, and for bringing the vehicle smoothly to a stop. From another aspect it relates to control valve mechanisms for controlling the stopping and starting and, in certain forms, the reversing of motors.

The propulsion systems to which the invention in its first aspect relates find particular utility in mine vehicles such as hydraulically propelled drills, kerf cutters, trucks, and other such machinery, but are not, of course, limited to such use. These propulsion systems ordinarily employ as a motive fluid a liquid under a relatively high pressure, perhaps one thousand pounds per square inch. To effect propulsion, the fluid is taken from a reservoir by a pump and delivered, desirably past a suitably loaded automatic relief valve, to a control valve device under the control of which it is delivered to effect the drive in one direction or another of the vehicle propulsion motor or motors, as the case may be. If desired, the fluid may be passed, between its point of delivery by the valve mechanism and a propulsion motor, or between a propulsion motor and its point of return to the valve mechanism on its way back to the tank, in such a manner relative to a reel driving mechanism that the reel may be caused to wind in a power cable which supplies current to a pump driving motor when the vehicle moves in a direction to make this necessary and that the reel may have cable drawn off it when this is called for.

The ordinary control valve which forms a part of these systems and which is used for the purpose of controlling the direction of propulsion provides for the requisite basic operations, but requires very careful manipulation of the controls by the operator, if serious shocks and possible ruptures of fluid conduits are to be avoided, these shocks being particularly hard to avoid if, while the vehicle is moving in a given direction, it be found necessary to bring it rather promptly to rest. It is, of course, possible with such vehicles simply to reverse the position of the control valve mechanism and supply fluid from the tank to the propulsion motor or motors in reverse direction, if an emergency stop is desired, but this is a very undesirable operation. It is also possible to move the valve mechanism for controlling the supply of propulsion fluid to such a position that the supply line from the tank and pump and the return line to the tank are both completely disconnected from each of the opposite sides of the propulsion motor or motors, but this, with conventional devices, results in the possibility of the building up of very great pressures in the piping, because the inertia of the vehicle causes it to continue to move and to rotate the propulsion motor in the direction in which it was turning at the moment of interruption of fluid supply, and, because, since the previously effective discharge or exhaust line will be blocked off, while the motor will still continue to rotate and be driven as a pump by the rotating wheels of the vehicle, some fluid will still tend to be forced into the exhaust line, which is then completely closed.

It is an object of my invention to provide an improved controlling system for hydraulically propelled vehicles. It is another object of my invention to provide an improved control valve mechanism for hydraulically operated motors driving loads which tend to continue the rotation of the motor after the fluid supply and exhaust lines are closed. It is a further object of my invention to provide an improved control valve mechanism for vehicle propulsion motors of the hydraulic type. It is still another object of my invention to provide an improved hydraulic control system suited, but not limited, to coal cutting or coal drilling machinery, for enabling utilization of liquid under high pressure to drive the wheels of the vehicle and providing, without dependence upon the skill and care of the operator, for the avoidance of unnecessary shocks to the mechanism and excessive pressures in hydraulic fluid conduits, when the propulsion motor or motors have their supply and exhaust conduits cut off during operation from their communication with fluid supply and exhaust lines. Other objects and advantages of my invention will hereinafter more fully appear.

In the accompanying drawings, in which two forms of my invention are shown for purposes of illustration, Fig. 1 is a plan view of a combined relief and distributing valve mechanism forming a portion of a vehicle propulsion control system which constitutes one aspect of my invention, and which per se incorporates an improved structure which is an embodiment of another aspect of my invention.

Fig. 2 is a longitudinal section on the plane of the line 2—2 of Fig. 1, through the mechanism shown in Fig. 1.

Fig. 3 is a transverse section on the plane of the line 3—3 of Fig. 1.

Fig. 4 is a top plan view of a vehicle supported coal drilling apparatus in which there is incorporated an illustrative embodiment of the system aspect of my invention.

Fig. 5 is a diagrammatic view showing the control system of the vehicle of Fig. 4.

Fig. 6 is a fragmentary sectional view on the same section as Fig. 2, showing a modification.

Referring first to Fig. 4, it will be observed that a vehicle 1 is supported by front wheels 2, 2 and rear wheels 3, 3 of the rubber-tired type. These wheels, or one pair thereof, may be propelled to effect propulsion of the vehicle 1. Herein the vehicle is shown as propelled by the rear wheels 3, and the front wheels are made steerable by any suitable means, not illustrated. The vehicle includes a hydraulically elevated boom 5 which carries a hydraulically fed and rotated drilling mechanism 6 for effecting the feed and rotation of a drilling implement 7. The vehicle carries a tank or reservoir 8 for hydraulic fluid and a motor driven pump 9 (see Figs. 4 and 5) is mounted within the tank 8. In the diagrammatic view of Fig. 5, it is shown outside the tank and as connected to the latter by a suction line 10, this arrangement being shown for simplicity of illustration. The pump 9 delivers fluid (liquid) under pressure to a controlling valve mechanism generally designated 11, which controls forward and reverse fluid supply conduits F and R connected to a hydraulic motor 12, herein shown as of the reversible, intermeshing gear rotor type, but which may obviously be one of many other reversible types. This motor is connected by a sprocket 13, a drive chain 14 and a larger sprocket 15 with a longitudinally extending shaft 16 which is connected through a differential mechanism, not shown, but arranged in a differential housing 17, to the two rear wheels 3. The valve device 11 includes an operating lever 19 for moving a valve stem 20 of a valve element 21, later more fully described, and forming an element of the valve mechanism 11. The vehicle 1 may be provided with a steering wheel 22 and a brake pedal 23. It also includes a reel 24 connected by a chain 25 for drive by a hydraulic reel driving motor 26. When the vehicle is moving in a direction, which may be called rearward for convenience, towards the point of connection of the power cable 27 which is wound upon the reel 24 and supplies current to the electric driving motor or motors of the vehicle, the fluid passes through the traction motor 12 and through the reel driving motor 26 in series. When the vehicle is propelled in a direction to make desirable the paying out of cable, which direction may for convenience be called forward, the fluid is delivered by means bypassing the reel driving motor to the traction motor 12, and the opposite sides of the reel driving motor 26, which may also desirably, though not necessarily, be of the intermeshing rotor type are connected directly with each other. This control of the flow relative to the reel driving motor is effected by a valve mechanism 28 which is per se the invention of one Harry H. Vanderzee and is disclosed and claimed in his application, Serial No. 571,991, filed January 9, 1945. It will be obvious that the propulsion circuits may be wholly distinct and independent of the reel drive circuit, and that the reel may be propelled in any other suitable manner.

Leaving for a moment the description of the diagrammatic view of Fig. 5, it may be noted that the pump 9 is connected by a conduit 30 to a chamber 31 in the valve mechanism 11. The chamber 31 is formed between bores 32 and 33 of slightly different diameters (the latter slightly the larger) in which there are received the spools 34 and 35 of a relief valve 36 which is held in the position shown in Fig. 2 by a spring 37, except when the fluid pressure in the chamber 31 exceeds a desired maximum value. The relief valve 36 is provided between the spools 34 and 35 thereof with a reduced stem portion 38 connecting the spools 34 and 35, and a balancing passage 39 extends axially through the valve element. In the position of the parts shown in Fig. 2 the fluid passes from the chamber 31 to a conduit 40 which opens into a chamber or groove 41, which is the center one of three annular chambers or grooves 41, 42 and 43 formed in another casing portion 44 of the valve mechanism. When the pressure gets very high in the chamber 31, it acts on the differential area provided by the spool 35 and moves the valve to the right in Fig. 2 and uncovers a passage 45 which communicates with a chamber 70, which is connected by a conduit 46 back to the tank 8. A passage 47 connects the end of a chamber 48 formed at the right-hand end of the bore 33, in which chamber the spring 37 is housed, with the conduit 45, so as to prevent the building up of a substantial pressure upon the right-hand end of the spool 35.

The chambers 41, 42 and 43 constitute annular recesses surrounding a bore 49 in which the valve 21 is reciprocable. The valve 21 has a bore 50 therein opening therethrough with full diameter at its right-hand end and connected by a passage 51 with a chamber 52 in the valve housing, at its left-hand end. Chamber 52 constitutes an enlarged extension of valve-receiving bore 49 and is connected to the exhaust chamber 70 through the hollow interior of the valve. The valve 21 has its wall perforated by a plurality of ports 53 each communicating with metering grooves 54 formed in the outer periphery of the valve element. The metering grooves 54 are formed in spools 55 and 56 which are separated from each other by a shallow groove 57 into which the ports 53 open. Outwardly of the spools 55 and 56, there are circumferential grooves 59 and 60 formed in the valve 21, with the result that end spools 61 and 62 are produced. The spools 55, 56, 61 and 62 all fit the bore 49. The stem 20 is connected to the spool 61 and at the other end of the valve there is arranged a sleeve portion 65 which a spring 66 normally maintains extended, the right-hand end of this sleeve engaging a shoulder at 67 on a portion 68 of the valve casing when valve 21 is in either mid or right-hand position. The hollow interior 50 of the valve 21 communicates continuously with the chamber 70 which is connected by the passage 46 back to the tank 8 and with which the passage 45 also communicates. The spring 66 acts at its left-hand end on a collar 71 which engages at times a shoulder 72 on the right-hand end of the spool 62 and at other times a shoulder 67' on casing portion 44. It will be evident that the spring will return the valve 21 to the position shown, after it has been moved to the left, through its action on the sleeve 65 and the action of the latter through a shoulder 73 thereon upon a shoulder 74 at the extreme right-hand end of the valve 21. When the valve 21 is moved to the right, in Fig. 2, it will move the collar 71 to the right, and compress the spring 66, so that the latter will recenter the valve when the stem 20 is made free to move.

It will be evident that by moving the valve 21 to the left until circumferential groove 60 connects the passage 40 and groove 41 with the groove 43, fluid will be delivered from the passage 40 to the groove 43, and in this adjusted position of the valve 21 the ports 53 and groove 57 will be in communication with the groove 42, and thus permit fluid returned to the groove 42 to pass through the ports 53 and the bore 50 within the valve to the space 70 and to the line 46 and back to the tank. The opposite movement of the valve 21 will connect the groove 43 to exhaust through the passages or ports 53 and the hollow interior of the valve and will permit the supply of fluid from the passage 40 to the annular groove 42 through the peripheral groove 59 in the valve. The chambers 42 and 43 are connected with conduits R and F, through which fluid may be caused to pass to effect propulsion of the vehicle in a direction towards the point of connection of its cable and in an opposite direction, respectively.

Now, it will be understood that if, when the valve 21 has been so displaced as to cause a flow of fluid to take place through the motor 12 in either direction and propulsion of the vehicle 1, the valve 21 be returned to mid position, the inertia of the vehicle will cause it to tend to continue to move in the same direction, but this will be impossible unless the fluid in the tooth pockets of the motor 12 can be displaced back to the tank or escape through internal leakage, and with a valve of the construction so far described there will be very serious shocks when the flow of fluid is cut off and very high pressures build up in the conduit F or R, whichever was serving as the return or exhaust line when the valve 21 was returned to center position.

There are herein illustrated two ways, each within the broad scope of my invention, by which this development of high pressures and subjecting of the machine to serious shocks can be avoided. One of these is shown particularly in Fig. 2 and the other in Fig. 6. In each of these arrangements, means is provided for enabling a restricted flow of fluid from the line leading from the motor exhaust last used to the valve chamber, back to the reservoir. In each of these arrangements the construction is such that there can be, during propulsion of the vehicle by the operating fluid, no leakage of fluid through these auxiliary escape passages to the exhaust, because such auxiliary passages are so arranged with respect to the remainder of the valve mechanism that they have no communication with fluid under substantial pressure when the valve 21 is in either of its positions for supplying fluid to the propulsion motor. Because it is desirable to be able to control rather precisely the conditions for escape of fluid back to the reservoir and, when desirable, to change these conditions, the arrangement of Fig. 2, is considered the preferable one. It is also felt to be preferable for most purposes in that it does not involve any continuation of the supply of liquid to the supply side of the motor after the valve 21 is brought to its off position.

Referring now further to Fig. 2, it will be noted that the valve casing portion 44 has two chambers 81 and 82 formed in it, and these chambers are respectively connected by smaller passages 83 and 84 with the valve-receiving bore 49. These last passages are so positioned that they will be at no time connectible with conduit 40 and annular groove 41 when fluid is being supplied to the traction motor. It will be noted that to connect grooves 41 and 43 the valve 21 must be moved to the left and that spool 62 will then prevent passage 83 from being in communication with passage 40; while when the valve 21 moves in the opposite direction, spool 61 plays a similar function. Each of the passages 83 and 84 is surrounded at its upper end by a valve seat, these being respectively numbered 85 and 86, and having cooperating with them check valve elements 87 and 88. Chamber 81 is connected in communication with the chamber 70 by the passage 45, and a special conduit 89 is provided for connecting the chamber 82 with the chamber 52, which, as previously noted, is connected with the exhaust. Each of the check valve elements 87 and 88 is spring loaded, there being a spring 91 associated with the valve element 87 and a spring 92 associated with the valve element 88. Followers 93 and 94 threadedly mounted in the upper ends of the chambers 81 and 82, and adjustable by taking the relief valve portion of the valve mechanism shown in Figs. 1, 2 and 3 off the main valve block 44 permit the predetermining of the relief point of the relief valves, and these relief pressures may desirably be on the order of 400 to 500 lbs. per square inch when the pressure in the conduit 40 is on the order of 1000 p. s. i.

The automatic reel control valve device 28 includes what may be called U-shaped passage arrangements 97 and 98 and further passage arrangements 99 and 100, these last mentioned passage arrangements connected by conduits 101 and 102 to the opposite sides of the reel driving motor 26. A conduit 103 connects the side of motor 12 which is opposite its connection with conduit R, to the passage 97. Conduit F is connected to passage 98. Leakage conduits 104, 105 from the propulsion motor and reel driving motor respectively connect with a direct leakage conduit 106 to the tank. This provides for the return of any fluid that may escape from the working chambers.

When fluid is delivered through the conduit R to the propulsion motor 12, does work therein, and then flows by the conduit 103 to the automatic valve mechanism 28, fluid will flow by way of the lower branch in Fig. 5 of the U-shaped passage 97 into the passage 100 and by way of the conduit 102 to the reel driving motor 26 and, after actuating the latter, will flow by the conduit 101 to passage 99 and to the upper end of the U-shaped passage 98 and then by way of the conduit F back to the interior of the valve mechanism 11 and through the passage means 43, 53, 50 of the latter, and the chamber 70, will go by way of the conduit 46 to the tank 8. Accordingly, the reel driving motor will drive the reel when the propulsion motor 12 is being driven by fluid delivered through the conduit R. When fluid is delivered under control of the valve mechanism 11 to the passage F, it will be delivered through the lower portion of the passage 98 to the lower portion of the passage 97, bypassing the reel, then reversely through the motor 12 and back through the conduit R, the valve passages 42, 53, 50 and the chamber 70, and the conduit 46 to the tank. The passages 99 and 100 will be connected together and the reel will be able to turn freely to permit the pulling off of the cable. The structure of this reel control mechanism is disclosed in the Vanderzee application and need not be more fully discussed herein. In fact, as previously indicated, the conduit 103 could be connected directly to the conduit F and the reel could be mechanically driven in any suitable manner. Such an arrangement is within the intended scope of my invention.

It has been indicated heretofore that the loading of the relief valves 81, 82 is such that the pressure at which they will open is about 40 to 50 percent of the supply pressure to the reel propulsion motor. It may now again be noted that the positions of the ports 83 and 84 are such that they will be cut off from communication with the grooves 43 and 42 whenever the valve 21 is in a position to supply fluid to one or the other of the grooves 43, 42. Accordingly, no fluid passing to either of the lines R or F from the pump 9 can escape past the valve elements 87 or 88. When, however, the valve 21 is in its neutral position, each of the grooves 42 and 43 has communication with one of the relief valve passages.

The mode of operation can now very quickly be summarized. Assume that the valve element 21 is moved to the right far enough to connect the annular chamber 42 with passage 40 through the groove 59. It will then be found that the annular groove 43 will be connected with exhaust through the passage or passages 53 and the hollow interior of the valve. It will further be noted that both of the passages 83 and 84 will be in communication with spaces within the bore 49 that are connected to the reservoir or tank 8. Fluid will flow from the passage 40 and the annular groove 41 through the groove 59 and the annular groove 42 and the passage R to effect propulsion of the motor 12 in a direction to move the vehicle in a direction toward the point of connection of the power supply cable, or, more fully described, fluid will pass from tank 8 through suction line 10, through pump 9, through line 30, through chamber 31, through passage 40, through groove 41, through peripheral groove 59, through annular groove 42, through conduit R, through the propulsion motor 12, through reel driving motor 26, through conduit F, through the groove 43, and the passages 53 and bore 50 into the space 70 which is connected to the conduit 46 leading back to the tank 8. The propulsion motor will now be operated by a hydraulic pressure of, say, 1000 p. s. i. to propel the vehicle. When it is desired to stop the vehicle, the valve 21 will be moved back to the position shown in Fig. 2. There will now be no connection between the conduit 40 and either of the chambers 42 and 43, and accordingly both sides of the propulsion motor 12 will be shut off from normal communication either with the supply or the discharge connections. However, since the inertia of the vehicle tends to cause the motor 12 to continue to rotate in the same direction in which it had previously been turning, after the groove 42 or 43, whichever (herein the groove 42) was serving as the exhaust line was cut off from communication with the tank 8, there would build up a very high pressure if it were not for the fact that the relief valve devices provided will open at whatever pressure they may be set for and thereby cause a braking, but a controlled and limited braking, action on the vehicle through resistance to further rotation of its wheels. The quantity of fluid that can be displaced past either of the check valves is, naturally, limited, and the number of turns of the motor rotors per turn of the propelling wheels 3 will desirably be such that before all of the fluid can be displaced the vehicle will ordinarily have come to rest. If, for any reason, the vehicle should still be in motion when the last of the available liquid had been displaced to the discharge side of the rotors, the operator could carefully partially reverse the position of the main control valve 21, and without undue shock to the system, having in mind the low speeds then prevailing, admit line pressure to the exhaust side of the propulsion motor, and certainly bring the vehicle to a standstill. Of course, the brakes provided can also be used.

It is unnecessary to set forth at length the operation that characterizes forward propulsion, and the stopping of the vehicle after forward propulsion, as what then occurs will be obvious from what has already been fully described.

Referring now to Fig. 6, it will be noted that the valve controlled passages 83 and 84 are replaced by open passages 83′ and 84′, and that the flow areas of these passages are determined in such a manner as to provide for only the desired amount of fluid to pass through these passages when the valve 21 is in central position. In the selection of the sizes of the passages, consideration must be given to the fact that the flow area must be large enough to prevent excessive pressures being built up, but at the same time the flow area must be made small enough to prevent any possibility of having so much fluid continue to be passed through the motor that the stopping of the vehicle will not take place quickly enough; and also it is desirable that the flow area be not great enough so as to permit the vehicle to start to drift at a dangerous speed if the brakes should not be tightly enough applied on a slope.

With this construction, let it be considered that fluid has been supplied from the annular groove 42 through the conduit R to the motor 12, and after passing through this motor and, with the hook-up shown in Fig. 5, through the reel driving motor, has returned through the conduit F to the annular groove 43, and passed from the latter through the radial ports 53 and the bore 50 to chamber 70 and to the conduit 46, and driven the vehicle rearwardly, and that the valve 21 is then returned to central position. It will be understood that, with the valve 21 in the central position, there will then be a controlled flow—controlled by the port areas of the ports 83′ and 84′—from the space 70 through the central chamber 50 in the valve, through the passage 51, through the chamber 52, through the passage 89, through the passage 84′, the groove 59, the annular groove 42, conduit R, motor 12, reel control valve 28, reel driving motor 26, reel control valve 28, and conduit F into annular groove 43 and through the peripheral groove 60 in the valve 21 to the passage 83′ and from the latter and passage 45 back to the chamber 70, with the result that the propulsion motor will be able to decelerate at such a rate as not to build up excessive pressures in the conduit F, or to impose unduly heavy shocks on the machine.

With this arrangement, fluid will continue to be circulated so long as the rotors of the motor 12 turn, and so there will be a continued application of back pressure, tending to stop the vehicle until it comes to rest, as contrasted with the other construction described in which, even with an arrangement whereby the conduits F and R sloped downwardly to the motor, no fluid not in these conduits or in the motor when the valve 21 was returned to central position could be caused to pass through the motor and to be discharged by the spring loaded check valves. It is again unnecessary to describe the bringing of the vehicle to a stop after travel in a forward direction, as the phenomena will be obvious from what has so far been explained in detail. As previously stated, the quantity of liquid which will be forced through the relief means will depend upon the relative positions of the reservoir and conduits and the motor or motors to the valve mechanism 11. With the arrangement of Fig. 6 a continued, restricted circulation of liquid may be maintained, or if the relative position of the ports is such as to enable drainage to the reservoir of the liquid as rapidly as it reaches chamber 70, the volume of liquid forced through the active relief passage may likely be only that in the valve mechanism and between the latter and the discharge port of the motor. In the case of the arrangement of Fig. 2, the amount of fluid forced past the active relief valve will be limited because of the presence of the other relief valve and its action as a check valve.

From what has been said, it will be understood that I have provided very simple and positive arrangements for controlling the propulsion wheels of a vehicle to bring the vehicle to a stop without undue shocks, and that I have also provided valve mechanism of an improved character particularly adapted to this function, but adapted also for bringing to a stop any motor driving a load which possesses considerable inertia. The structure is simple. The possibility of loss of fluid through the relief means during driving of the propulsion motor in either direction is prevented by cutting the relief passages off from all communication with passages filled with line pressure, and yet the relief means are rendered immediately effective whenever the vehicle has its control valve brought to off position.

While there is in this application specifically described two forms which the invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. In combination, in a vehicle, vehicle supporting and propelling devices, a source of hydraulic fluid, a pump connected to draw fluid from said source and to deliver it under pressure, a reversible motor for actuation by said fluid and having a driving connection with said vehicle supporting and propelling devices, operator-controlled valve means and associated conduit means for effecting operator-controlled connection of said pump to said motor for the supply of operating fluid to drive the latter in either direction and connection of said motor, regardless of its direction of rotation, to said hydraulic fluid source for returning to the latter fluid which has done work in said motor, means for providing, when said valve means is moved to interrupt whichever fluid return connection between said motor and said source subsists during operation of said motor by said hydraulic fluid, a restricted return connection from said motor to said source, including passage means, and means to prevent connection of fluid supply with said passage means.

2. In combination, in a vehicle, vehicle supporting and propelling devices, a source of hydraulic fluid, a pump connected to draw fluid from said source and to deliver it under pressure, a reversible motor for actuation by said fluid and having a driving connection with said vehicle supporting and propelling devices, operator-controlled valve means and associated conduit means for effecting operator-controlled connection of said pump to said motor for the supply of operating fluid to drive the latter in either direction and connection of said motor, regardless of its direction of rotation, to said hydraulic fluid source for returning to the latter fluid which has done work in said motor, means for providing, when said valve means is moved to interrupt whichever fluid return connection between said motor and said source subsists during operation of said motor by said hydraulic fluid, a restricted return connection from said motor to said source, including passage means having means for yieldably resisting flow therethrough, and means to prevent connection of fluid supply with said passage means.

3. In combination, in a vehicle, vehicle supporting and propelling devices, a source of hydraulic fluid, a pump connected to draw fluid from said source and to deliver it under pressure, a reversible motor for actuation by said fluid and having a driving connection with said vehicle supporting and propelling devices, operator-controlled valve means and associated conduit means for effecting operator-controlled connection of said pump to said motor for the supply of operating fluid to drive the latter in either direction and connection of said motor, regardless of its direction of rotation, to said hydraulic fluid source for returning to the latter fluid which has done work in said motor, means for providing, when said valve means is moved to interrupt whichever fluid return connection between said motor and said source subsists during operation of said motor by said hydraulic fluid, a restricted return connection from said motor to said source, including passage means so proportioned as to maintain a retarding back pressure on said motor during fluid flow through them, and means to prevent connection of fluid supply with said passage means.

4. In combination, in a valve mechanism, a valve casing having a valve-receiving bore therein connected at one end to exhaust, a hollow valve received in said bore and having its bore communicating with said exhaust connection, spaced grooves surrounding and communicating with said valve-receiving bore and adapted for connection to alternative fluid supply and exhaust connections of a motor, and an intermediate annular groove communicating with said bore and having a fluid supply port leading thereto, said valve having in its periphery spaced grooves and having end spools, and intermediate spools spaced by said grooves from said end spools and separated also from each other by a central annular groove and said valve having radial passages connecting said central groove with its bore, said spaced grooves in said valve communicating with said spaced grooves surrounding said valve-receiving bore when said valve is in central position, and vent passages connected with exhaust and having communications with said valve-receiving bore at points so spaced that they are in communication, through the spaced annular grooves in the valve, with said spaced annular grooves surrounding said valve-receiving bore only when said valve is in substantially mid-position.

5. In combination, in a valve mechanism, a valve casing having a valve-receiving bore therein connected at one end to exhaust, a hollow valve received in said bore and having its bore communicating with said exhaust connection, spaced grooves surrounding and communicating with said valve-receiving bore and adapted for connection to alternative fluid supply and exhaust connections of a motor, and an intermediate annular groove communicating with said bore and having a fluid supply port leading thereto, said valve having in its periphery spaced grooves and having end spools, and intermediate spools spaced by said grooves, from said end spools and separated also from each other by a central annular groove and said valve having radial passages connecting said central groove with its bore, said spaced grooves in said valve communicating with said spaced grooves surrounding said valve-receiving bore when said valve is in central position, and vent passages connected with exhaust and having communications with said valve-receiving bore at points so spaced that they are in communication, through the spaced annular grooves in the valve, with said spaced annular grooves surrounding said valve-receiving bore only when said last mentioned grooves are out of communication with said intermediate annular groove which has a fluid supply port leading thereto.

6. In combination, in a valve mechanism, a valve casing having a valve-receiving bore therein connected at one end to exhaust, a hollow valve received in said bore and having its bore communicating with said exhaust connection, spaced grooves surrounding and communicating with said valve-receiving bore and adapted for connection to alternative fluid supply and exhaust connections of a motor, and an intermediate annular groove communicating with said bore and having a fluid supply port leading thereto, said valve having in its periphery spaced grooves and having end spools, and intermediate spools spaced by said grooves from said end spools and separated also from each other by a central annular groove and said valve having radial passages connecting said central groove with its bore, said spaced grooves in said valve communicating with said spaced grooves surrounding said valve-receiving bore when said valve is in central position, and vent passages connected with exhaust and having communications with said valve-receiving bore at points so spaced that they are in communication, through the spaced annular grooves in the valve, with said spaced annular grooves surrounding said valve-receiving bore only when said last mentioned grooves are out of communication with said intermediate annular groove which has a fluid supply port leading thereto, said vent passages having spring loaded check valves controlling the flow through them to exhaust.

7. In combination, in a valve mechanism, a valve casing having a valve-receiving bore therein connected at one end to exhaust, a hollow valve received in said bore and having its bore communicating with said exhaust connection, spaced grooves surrounding and communicating with said valve-receiving bore and adapted for connection to alternative fluid supply and exhaust connections of a motor, and an intermediate annular groove communicating with said bore and having a fluid supply port leading thereto, said valve having in its periphery spaced grooves and having end spools, and intermediate spools spaced by said grooves from said end spools and separated also from each other by a central annular groove and said valve having radial passages connecting said central groove with its bore, said spaced grooves in said valve communicating with said spaced grooves surrounding said valve-receiving bore when said valve is in central position, and vent passages connected with exhaust and having communications with said valve-receiving bore at points so spaced that they are in communication, through the spaced annular grooves in the valve, with said spaced annular grooves surrounding said valve-receiving bore only when said last mentioned grooves are out of communication with said intermediate annular groove which has a fluid supply port leading thereto, said vent passages having check valves controlling the flow of fluid through them to exhaust, and means for adjustably loading said check valves.

8. In combination, a valve casing having a bore therein for reciprocably receiving a valve and having with said bore connections as follows: a connection for the transmission to a motor of an operating fluid, a connection for the return of exhaust fluid from a motor, a connection for the supply of an operating fluid under pressure to said bore and a connection for the conducting away of exhaust fluid, a valve in said bore for selectively connecting said first and third and second and fourth connections with each other, or for connecting said third and fourth connections with each other while preventing communication of said first connection with said third connection and interrupting the communication between said second and fourth connections which subsists during connection of said first and third connections, restricted passage means opening into said bore to provide for restricted flow from said second connection to said fourth connection with the valve in position to prevent communication with the second and fourth connections, and means including the valve to prevent connection of said third connection with said passage means.

9. In combination, a vehicle having a hydraulic propulsion motor, a source of hydraulic fluid, a pump, conduit means, valve means for controlling the flow of fluid through said conduit means from said pump to said motor and its return from said motor to said source to effect vehicle propulsion and movable to interrupt both of such flows to stop vehicle propulsion, and means for conducting fluid displaced by said motor as said vehicle comes to a stop, to said source, including a relief passage, and means including the valve means to prevent connection of the pump discharge with the relief passage during vehicle propulsion by said motor.

10. In combination, a vehicle having a hydraulic propulsion motor, a source of hydraulic fluid, a pump, conduit means, valve means for controlling the flow of fluid through said conduit means from said pump to said motor and its return from said motor to said source to effect vehicle propulsion and movable to interrupt both of such flows to stop vehicle propulsion, and means for conducting fluid displaced by said motor as said vehicle comes to a stop to said source including a relief passage, a loaded relief valve controlling the flow of fluid through said relief passage, and means including the valve means to prevent connection of the pump discharge with the relief passage during vehicle propulsion by said motor.

11. In combination, a vehicle having a hydraulic propulsion motor having supply and exhaust connections, a source of hydraulic fluid, a pump, conduit means, valve means for controlling the flow of fluid through said conduit means from said pump to said motor supply connection and its return from the exhaust connection of said motor to said source to effect vehicle propulsion and movable to interrupt both of such flows to stop vehicle propulsion, means for enabling a continued displacement of fluid by said motor as said vehicle comes to a stop including a restricted passage, and means including the valve means to prevent connection of the pump discharge with the restricted passage during vehicle propulsion by said motor.

12. In combination, a vehicle having a reversible hydraulic propulsion motor having connections usable alternatively as supply and exhaust connections, a source of hydraulic fluid, a pump, conduit means, valve means for controlling the flow of fluid through said conduit means from said pump to said motor to effect operation thereof in either direction and the return of fluid from said motor to said source irrespective of the direction of motor operation, said valve means movable to interrupt both of such flows to stop vehicle propulsion, and means for conducting fluid displaced by said motor to said source as said vehicle comes to a stop including alternatively effective relief passages one or the other functioning dependent on the preceding direction of motor operation and means including the valve means to shut the relief passages off from communication with pump discharge during vehicle propulsion by said motor.

13. In combination, a vehicle having a reversible hydraulic propulsion motor having connections usable alternatively as supply and exhaust connections, a source of hydraulic fluid, a pump, conduit means, valve means for controlling the flow of fluid through said conduit means from said pump to said motor to effect selective operation of the latter in either direction and the return of fluid from said motor to said source irrespective of the direction of vehicle operation, said valve means movable to interrupt both of such flows to stop vehicle propulsion, and means for enabling a continued displacement of fluid by said motor as said vehicle comes to a stop including passages so related to said valve means as to be shut off from communication with pump discharge during vehicle propulsion by said motor and each adapted to function either as a supply or as a relief passage dependent on the direction of motor operation just preceding its stopping.

MAXWELL O. DEAN.

REFERENCES CITED

The following references are of record in the file of this patent:

UNITED STATES PATENTS

| Number | Name | Date |
| --- | --- | --- |
| 2,157,240 | Keel | May 9, 1939 |
| 2,202,216 | Madsen | May 28, 1940 |
| 2,205,647 | Ferris | June 25, 1940 |
| 2,229,419 | Merrill | Jan. 21, 1941 |
| 2,339,001 | Clay et al. | Jan. 11, 1944 |
| 2,342,450 | Campbell | Feb. 22, 1944 |
| 2,380,705 | Proctor | July 31, 1945 |